United States Patent [19]

Jensen et al.

[11] 4,063,252

[45] Dec. 13, 1977

[54] METHOD AND APPARATUS FOR CONTROLLING THE VELOCITY OF INK DROPS IN AN INK JET PRINTER

[75] Inventors: Donald Frederick Jensen, Endicott; John Carl Tamulis, Binghamton; Thomas Tomasky, Endicott; Jack Louis Zable, Vestal, all of N.Y.

[73] Assignee: International Business Machines Corporation, Armonk, N.Y.

[21] Appl. No.: 740,702

[22] Filed: Nov. 11, 1976

[51] Int. Cl.2 .............................................. G01D 18/00

[52] U.S. Cl. ...................................................... 346/75

[58] Field of Search ............................ 346/75, 140 R; 73/194 E

[56] References Cited

U.S. PATENT DOCUMENTS

| | | | |
|---|---|---|---|
| 3,787,882 | 1/1974 | Fillmore et al. | 346/75 |
| 3,907,429 | 9/1975 | Kuhn et al. | 346/75 X |

*Primary Examiner*—George H. Miller, Jr.

*Attorney, Agent, or Firm*—John S. Gasper

[57] ABSTRACT

In an ink jet printer, drops are generated at a test frequency which is a harmonic of the drop generation rate for printing. If an error in velocity is detected at the test frequency, a coarse correction velocity is made to bring the correct number of drops within the range of one-half the wavelength at the nth drop location relative to a drop detector. Drops are then generated at the printing frequency and a fine correction in the velocity is made if a velocity error is detected.

2 Claims, 4 Drawing Figures

| DROPS $e_f$ | DROPS $e_{1.2f}$ | DROP error | DROPS (x 6) | | $\phi$error | (x 6) $\phi$error |
|---|---|---|---|---|---|---|
| 7 | 8.4 | +.4 | +2.4 | | +144° | +864° |
| 8 | 9.6 | −.4 | −2.4 | | −144° | −864° |
| 9 | 10.8 | −.2 | −1.2 | | −72° | −432° |
| 10 | 12.0 | 0 | 0 | | 0° | 0° |
| 11 | 13.2 | +.2 | +1.2 | | +72° | +432° |
| 12 | 14.4 | +.4 | +2.4 | | +144° | +864° |
| 13 | 15.6 | −.6 | −2.4 | | +216° −144° | |

METHOD AND APPARATUS FOR CONTROLLING THE VELOCITY OF INK DROPS IN AN INK JET PRINTER

BACKGROUND OF THE INVENTION

1. 1 Field of the Invention

This invention relates to ink jet printing and particularly to a method and apparatus for controlling the velocity of ink drops in an ink jet printer.

2. Description of the Prior Art

In ink jet printers of one well-known type, drops of a field-controllable ink are formed and propelled from a nozzle toward a print medium. Ink is supplied to the nozzle under pressure sufficient to cause the ink to issue from the nozzle as a continuous stream. Drop forming means such as a piezoelectric or magnetostrictive transducer attached to the nozzle or other means such as an electromagnetic excitor in the vicinity of the stream generates perturbations in the stream to cause it to break into individual drops of substantially uniform size and spacing. Field control devices located in the vicinity of the trajectory of the stream are regulated in accordance with data signals to cause the individual drops to be dispersed onto the print medium to form data patterns. To insure proper placement of the drops it is important that the velocity of the drops while moving along the trajectory be maintained as constant as possible.

The need for maintaining the velocity of the ink drops substantially constant to insure good print quality is well recognized in the art. One velocity correction scheme is described in U.S. Pat. No. 3,600,955, issued on Aug. 24, 1971, to V. E. Bischoff. This velocity correction scheme is based upon determining the phase difference between electrical pulses generated by a drop detector located adjacent to the stream and the electric pulses applied to the drop charging tunnel. A resultant time variable pulse representing drop velocity is used to operate a meter calibrated to display the degree and direction of any velocity error. A human operator while observing the meter operates the ink pump to change the pressure to make the desired adjustment in drop velocity.

In a publication by W. T. Pimbley in the IBM Technical Disclosure Bulletin, on page 948+ of Volume 16, No. 3, August 1973, velocity correction is achieved by determining phase variances between drop generating pulses applied to an ink stream excitor and drop sensing pulses of a drop detector located a fixed distance apart in the direction of the ink stream trajectory.

In the prior art schemes the maximum detector pulse phase shift, i.e. the maximum velocity error for which an accurate velocity correction can be made is 180°. Another way of considering this is that a drop will be directly aligned with the detector for ideal velocity when the drop generator or the drop charging tunnel is pulsed. When a velocity change occurs at the same drop generating frequency, the drop will not be aligned with the detector. Thus, if there is a decrease of velocity, the drop that was previously aligned with the detector will not have travelled as far and will be located upstream for the detector when the drop generator is pulsed. Similarly, an increase in velocity will cause the drop to be located downstream of the detector when the drop generator is pulses. When proper velocity correction is made, the drop located closest to the detector will align with the detector. Thus, for example, the fast stream will be slowed and the drop near the detector will shift upstream and align with the detector at the time when the generator is pulsed. Accurate velocity correction according to prior art schemes can only be made when the distance between the drop associated with the $n$th wavelength and the detector is less than one-half of a drop wavelength at the time when the drop generator or drop charger is pulsed. The prior art velocity correction schemes are not effective to correct for gross velocity errors, that is, an error in which the shift is more than one-half a wavelength at the $n$th drop location relative to the detector. In other words, where a gross velocity error exists, the number of drops between the drop generator and the drop detector may be incorrect. An adjustment using the prior art schemes may not correct for the number of drops that should be present in the stream. Thus, the prior art velocity correction schemes might actually show no velocity error when, in fact, the number of drops in the drop stream at the time the velocity error correction is made may actually be too few or too many.

SUMMARY OF THE INVENTION

It is a general object of this invention to provide an improved ink jet printer and method of operation.

It is a further object of this invention to provide an improved method and apparatus for controlling the velocity of the ink drops in an ink jet printer.

It is also an object of the present invention to provide an improved method and apparatus for correcting for changes in the velocity of the ink drops in an ink jet printer.

It is a still further object of the present invention to provide a method and apparatus which can correct for gross velocity errors in an ink jet printer.

It is a still further object of this invention to provide an improved method of correcting for gross velocity errors in an ink jet system which can be used with a single ink drop detector.

It is also an object of this invention to provide an improved method and apparatus for correcting for both gross and fine velocity errors in an ink jet printer.

Basically, the above as well as other objects, are obtained in accordance with this invention by checking the velocity of an ink jet stream in two stages. After making an initial fine velocity correction, to insure that some drop is exactly aligned with the detector, one velocity check is made for the purpose of determining whether a gross error exists. If so, at least one coarse correction of the velocity is made to the ink drop stream to bring the correct number of drops within the range of one-half the wavelength at the $n$th drop location relative to the detector. A second velocity check is made to determine a fine velocity error and a fine correction is made to complete the velocity correction.

Basically, in accordance with the preferred manner in which the coarse and fine correction is made, the existence of a gross error is determined by generating drops at a test frequency which is some harmonic or subharmonic of the printing frequency. If the test frequency establishes the existence of a gross velocity error, a coarse correction is made to stream velocity. The method then calls for checking the velocity at the printing frequency to determine if a fine velocity error exists. If so, a fine velocity correction is made. Essentially the apparatus for performing the two-step velocity correction comprises a single drop detector located a fixed number of drop wavelengths (λ) from the drop formation point to the drop stream produced by a drop generator. The control means is provided for operating the drop generator at either the printing frequency or the test frequency. A means is also provided in the control means for detecting the existence of a velocity error at the test and printing frequencies and making a coarse correction or a fine correction to the velocity by adjustment of the pump means which applies pressure to the ink supply. The control means further includes a means to inhibit the velocity correction from locking in on the nearest drop when a coarse correction is indicated.

Thus, in this manner, the invention provides a velocity correction scheme for an ink jet printer in which both coarse and fine correction capabilities exist. The need for human operator intervention to obtain the coarse and fine correction is eliminated. Further, this invention provides a means whereby the velocity of the drops is corrected while at the same time assuring that the proper number of drops exist in the stream at the proper spacing to effectuate high quality ink drop printing.

The foregoing and other objects, features and advantages of the invention will be apparent from the following more particular description of preferred embodiments of the invention, as illustrated in the accompanying drawings.

DETAILED DESCRIPTION OF THE INVENTION

Figure 1:
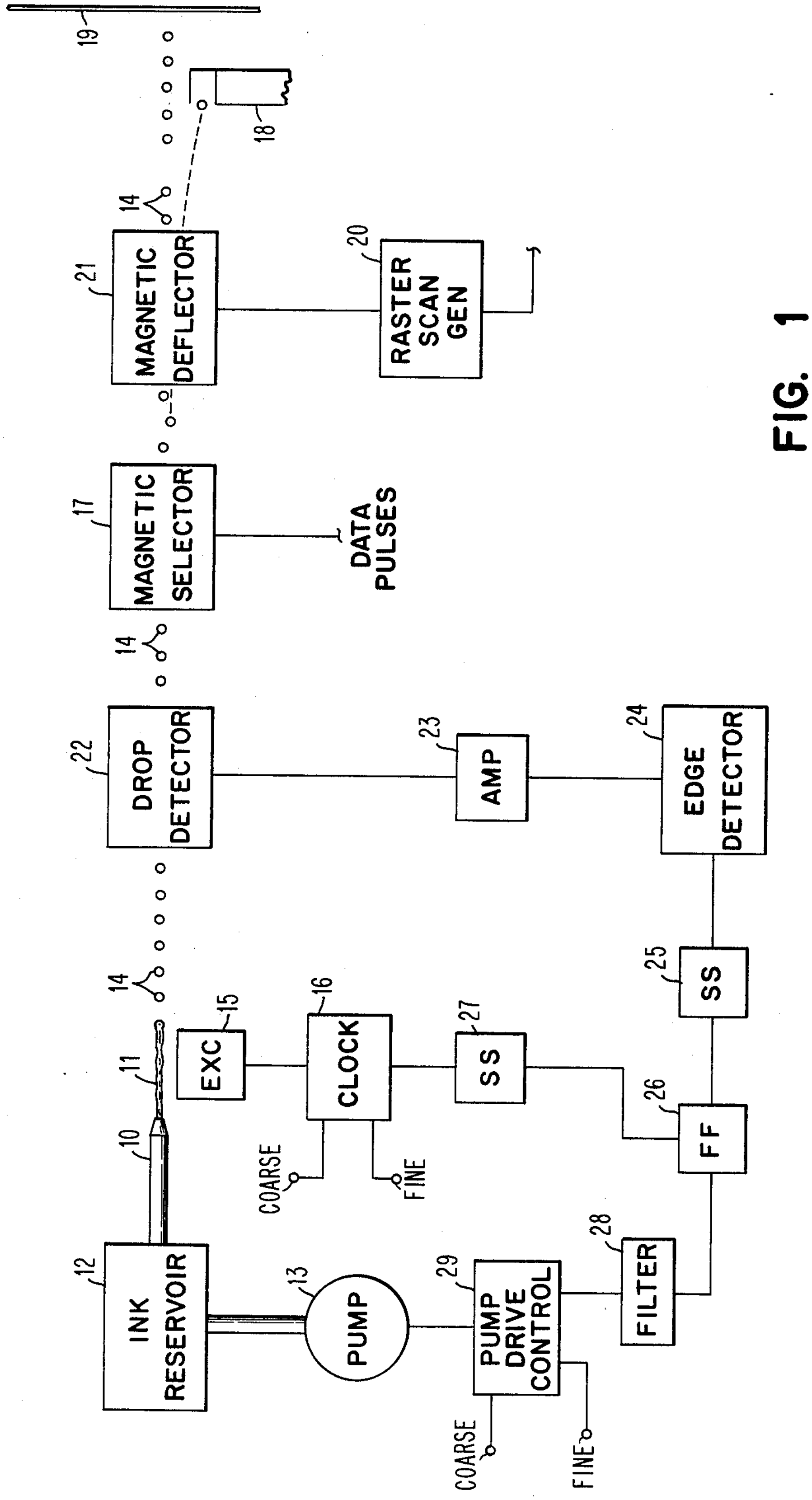
FIG. 1 is a schematic version of one type of ink jet printer system employing the velocity control of the invention.

As seen in FIG. 1, a magnetic ink jet printer system comprises a nozzle 10 through which a stream of field controllable ink 11, such as a ferromagnetic ink, is ejected under pressure applied by a pump 13 to an ink reservoir 12. Drops 14 are formed in the ink stream by operation of an electromagnetic excitor 15 located at a predetermined distance from the nozzle at a position before the stream breaks into drops. The magnetic excitor 15 is designed to produce perturbations in the ink stream at a predetermined frequency causing the ink drops to form with a desired drop size and wavelength (i.e. spacing). The rate of generating the drops and, hence, the control over drop wavelength is provided by a clock 16 which applies pulses to an energizing winding of the magnetic excitor. The excitor 15 may take various forms, but is preferably a magnetic transducer of the type described in U.S. Pat. No. 3,959,797, issued on May 25, 1976, to D. F. Jensen.

Drops not to be used for printing are deflected from the initial stream trajectory by a magnetic selector 17 into a gutter 18 located in advance of a record medium 19. A pattern of electric pulses is applied to the magnetic selector 17 in timed relation with the flight of the ink drops toward the record medium 19. A raster scan signal is applied to a magnetic deflector 21 by a raster scan generator 20 which causes the ink drops to be dispersed in a manner orthogonal to the initial trajectory to become deposited on record medium 19 in a data pattern. The printer system thus far described is well-known in the art. Further details of construction and operation may be more fully understood by reference to the above-mentioned Jensen patent.

As previously described, it is essential that the number as well as the velocity of the ink drops 14 be kept as nearly constant as possible. In accordance with this invention, the control over the velocity of the drops comprises an ink drop detector 22, located preferably in advance of selector 17, at a fixed number of wavelengths from the position at which the perturbation force of the excitor 15 is applied to the stream under control of clock 16 when operating at the printing frequency. The drop detector 22, which can take various forms, generates an electric pulse for each drop 14 moving past the detection station in flight for the print medium 19. The preferred type of drop detector, as described in the IBM Technical Disclosure Bulletin, Vol. 16, No. 3, August 1973, at page 880, uses an optical fiber for projecting a narrow light beam across the stream trajectory toward a light sensitive semiconductor element. Each drop 14 interrupts the light beam causing an electrical pulse to be generated by the semiconductor element. Further details of construction of the drop detector may be had by reference to the above-mentioned publication.

Pulses from the drop detector 22, after passing through amplifier 23 and edge detector 24 and single shot 25, are applied to a first input of flip-flop 26 to turn it on. A second input of flip-flop 26 is connected to a single shot 27 to be turned off by individual pulses of clock 16 which are used to drive the magnetic excitor 15. Flip-flop 26 produces a time variable signal depending on the phase relationship of the drop detector pulses and the drop generating pulses which are applied to a filter 28, which in turn converts the flip-flop signal to an analog voltage, whose magnitude varies in accordance with the width of the flip-flop output signal. The analog voltage from filter circuit 28 is compared with reference voltages $\pm V_{ref}$ and applies a coarse or fine adjustment control signal in the desired direction to regulate the pressure applied to the reservoir 12 by pump 13.

As previously described, the preferred method of practicing this invention involves operating the drop generator, i.e. excitor 15, at at least one test frequency which determines whether the correct number of drops is being produced when the drops are in correct alignment with the drop detector 22. The rate of the test frequency is some harmonic or subharmonic of the operating frequency. If the drops are in phase with the drop detector at both the test frequency and the printing frequency, then the correct number of drops is present in the stream, and no coarse or fine adjustment is required. However, if after performing a fine velocity correction (printing frequency), an out-of-phase condition is signified at the test frequency, the number of drops in the stream between excitor 15 and drop detector 22 is incorrect and a gross velocity error exists. Thus, when the velocity control means produces a voltage from filter 28 indicating an out-of-phase condition at the test frequency a coarse correction is applied to the pump 13 by pump drive control 29, since an error greater than one wavelength exists. Following the coarse correction, the pulse rate of clock 16 is again set at the printing frequency, since the coarse correction of pump 13 has adjusted the pressure to cause the number of drops to be equivalent to the number of wavelengths between excitor drop detector 15 and 22 at the test frequency. The number of drops at the printing frequency should now equal the number of wavelengths between excitor 15 and drop detector 22 at the operating frequency. If the voltage from filter 28 now indicates an out-of-phase condition, the pump drive control 29 is operated to apply a fine adjustment to pump 13 to increase or decrease the pump pressure to shift the position of the *n*th drop by an increment less than 180°. The magnitude of the coarse and fine adjustments is more or less arbitrary, dependent on the test and printing frequencies, and the desired operating characteristics of a particular pump and the ink jet system. In a specific example used, the coarse and fine adjustment were selected to have a 4 to 1 ratio at test frequency = 1.2 printing frequency.

While in many applications a complete velocity correction cycle may be achieved with a single coarse and fine adjustment sequence, operating conditions may be experienced in which a single sequence may not be enough. Such may occur when the coarse adjustment is limited relative to the fine adjustment and/or very large gross errors occur. Such a case may exist in the latter instance where the error in the number of drops may be greater than one. For example, there may be 8 or 12 drops in a 10 wavelength separation between excitor 15 and drop detector 22 when clock 16 is generating pulses at the printing frequency. In that situation, it may be desirable to apply the test frequency and produce a coarse adjustment (with at least one fine adjustment) more than once until an in-phase condition is detected at both the test frequency and the printing frequency.

While the method of this invention may be practiced with the first step being the test frequency for making a gross velocity error determination, the preferred manner of practicing the invention is to test for error at the printing frequency and making one or more fine adjustments to provide an in-phase condition (a drop aligned with detector), but not necessarily involving the correct number of drops, and then testing at the test frequency, i.e. the harmonic of the printing frequency, to determine whether a gross error exists.

Figures 2, 4:
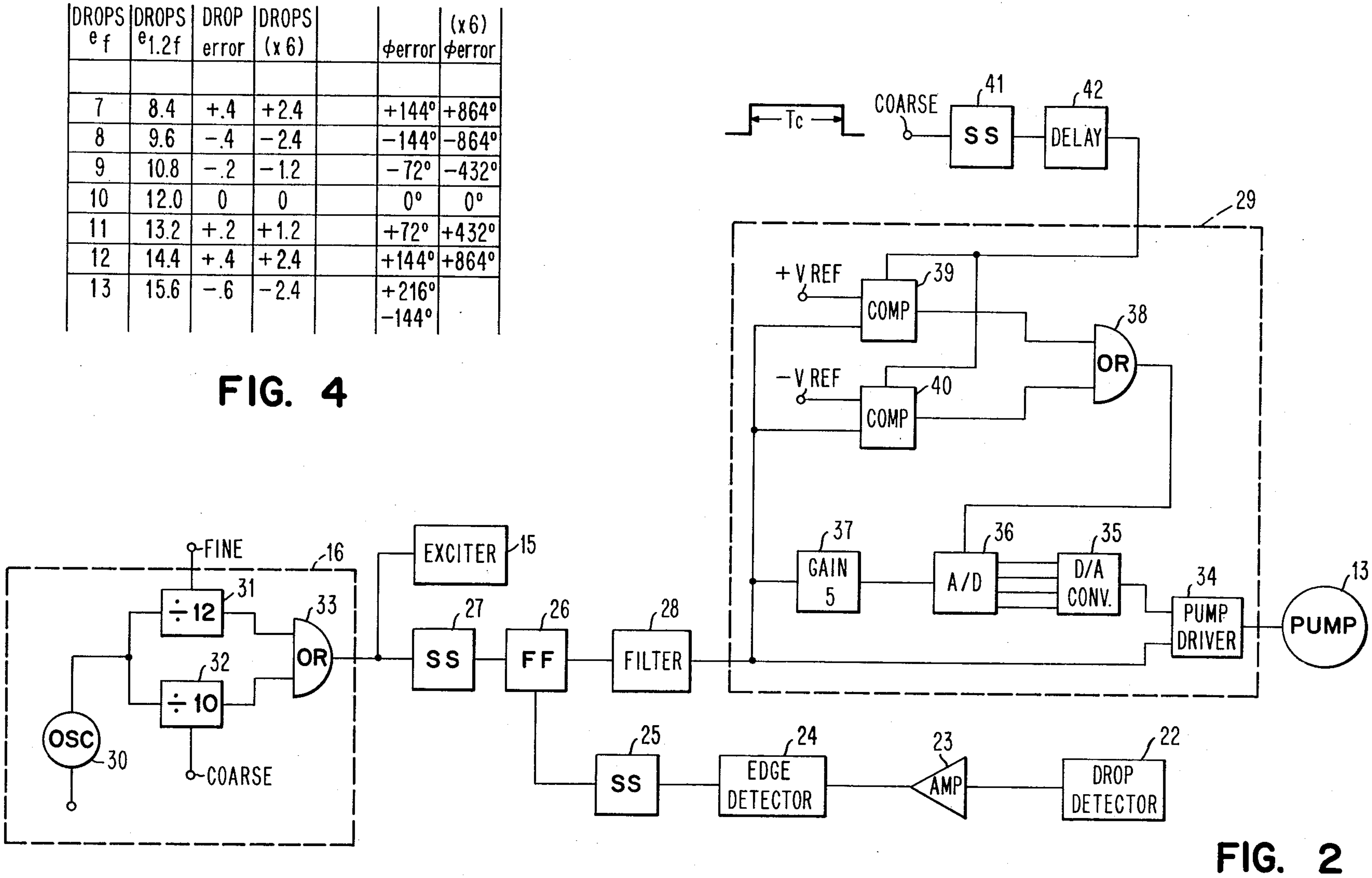
FIG. 2 is a logic diagram description of the coarse/-fine controls for operating the pump to make coarse/-fine corrections to the velocity of the ink drops in the ink jet printer described in FIG. 1.
FIG. 4 is a table showing one set of parameters for understanding the description of the operation of the invention in accordance with the embodiments illustrated in FIGS. 1–3.

In the embodiment of FIG. 2, the invention is practiced and will be described where a single coarse correction is made to adjust the velocity of the drops so that any velocity error that exists may be corrected by a subsequent fine adjustment in the velocity and will have the correct number of drops present. As seen in FIG. 2, clock 16 comprises a high frequency oscillator 30 connected through a 12 count counter 31 and a 10 count counter 32 having outputs through OR gate 33 to excitor 15 and single shot 27. Counters 31 and 32 are gated ON by FINE and COARSE adjust signals, respectively, derived from an external logic device which may be a processor. Thus, when coarse adjust is desired, counter 32 is turned on by a COARSE signal while counter 31 is turned off. [Conversely, counter 32 is turned on and counter 31 turned off for fine adjust.] Counter 31 is selected to apply pulses to the excitor 15 and flip-flop 26, as previously described, at the printing frequency, while counter 32 is selected to apply a test frequency greater than the printing frequency. In one particular arrangement the test frequency selected is 20 percent greater than the printing frequency for an arrangement in which excitor 15 and drop detector 22 has a spacing of 10 drop wavelengths at the printing frequency. Thus, at the proper drop velocity at the printing frequency produced by clock 16, 10 drops will be in flight at uniform spacing between excitor 15 and drop detector 22. Suppose there are actually 10.3 drops. The pulses from drop detector 22 and from counter 32 of clock 16 will through flip-flop 26 and filter 28 indicate a phase error of 108°, i.e. 0.3 × 360°. Since the phase error is less than 180°, only a fine adjustment in the pressure from pump 13 is required to make the correct velocity adjustment.

As seen in FIG. 2, the pump drive control 29 further comprises a pump driver circuit 34 which makes a fine adjustment from the output voltage of filter 28, if there is no further bias voltage $V_B$ applied from a converter 35. In the fine adjust mode, $V_B$ is set at a reference level which adds no voltage to the voltage from the filter 28. In the coarse adjust mode, the level of $V_B$ is altered in direction and magnitude, depending upon the inputs from the amplification of the output voltage by gain 5 amplifier 37 and applied to the A/D converter 36 connected to D/A converter 35 when gated by a short time interval signal from OR gate 38. Coarse control determination is made further by applying the output voltage from filter 28 to comparators 39 and 40. A $+V_{ref}$ is applied to comparator 39 and a $V_{ref}$ is applied to comparator 40. The voltage of $\pm V_{ref}$ is set just below the minimum error voltage for a single wavelength so that the crossing of either reference voltage by the voltage from filter 28 provides an indication of direction, as well as amount. To assure that a coarse error adjustment is made, i.e. correction, will not lock in on the nearest fine adjustment, the coarse adjust single shot 41 is timed to stay on long enough to hold A/D and D/A converters 36 and 35 on, to apply the bias voltage $V_B$ for a long enough period of time to cause the pressure pump 13 to change beyond the level of a fine adjust increment before it is turned off.

The specifics of how the coarse/fine adjust system of FIG. 2 can be more readily understood by considering the following specific example. Assume the spacing of the excitor 15 and the detector 22 is set at 10 wavelengths for ideal velocity and printing frequency. Then in the fine adjust mode, a FINE signal activates clock 16 to produce pulses applied to excitor 15 through counter 31 and OR gate 33 causing drops to be generated at the printing frequency. Pulses from clock 16 also turn on flip-flop 26 and flip-flop 26 is turned off by pulses from the drop detector 22. The pulse output from flip-flop 26 is converted by filter 28 to a voltage whose amplitude represents the magnitude of the phase error in the drops. For example, suppose there are 10.3 drops in the distance of 10 wavelengths. The system acting in a manner of the phase-locked loop compensates for a phase error of 108° until it is at 10.0 in response to a control voltage from filter 28 which applies a fine adjust to the pump driver 34. Since the COARSE signal is off, no bias voltage $V_B$ appears at pump driver 34 from D/A converter 35.

However, in the event the velocity decreased by 10 percent, there would be 11 drops in the distance of 10 wavelengths, which gives the same phase error as 10. To make the determination whether the correct number of drops is present, the frequency of clock 16 is increased by applying a COARSE signal to counter 32 of clock 16 and turning off the FINE signal to counter 31. The test frequency is 20 percent greater than the printing frequency, which now produces 13.2 drops in the space from excitor 15 to drop detector 22. As shown in the table of FIG. 4, this produces the minimum phase error of 72°. The minimum phase error for coarse correction corresponds to a one drop error during fine correction. [The same minimum phase error is obtained for a drop count of 10.8 (9 drops in the fine correction) except it is negative, $-72°$.] If the filter is adjusted such that a 72° phase shift corresponds to say 0.2 volts, then a $-72°$ shift corresponds to $-0.2$ volts. The threshold levels of $\pm V_{ref}$ applied to comparators 39 and 40 are set just below $\pm 0.2$ v, which when crossed by the voltage from filter 28, signify the need for a coarse adjustment in the direction determined by whatever $V_{ref}$ was crossed. In the case of a drop count of 13.2, the $+V_{ref}$ is crossed, which turns on comparator 39. The signal from single shot 41 and delay circuit 42 is set for a time which allows just enough time to read out the digital level of the A/D converter 36 at the time the $+0.2$ v error exists. It should be noted that the level contained in the A/D converter 36 is the product of gain amplifier 37 and the phase error voltage from filter 28, namely, $5 \times 0.2 = 1.0$ volts. This along with the voltage from filter 28 (a total of 1.2 volts) is the amount of correction to produce 12 drops. The correction bias voltage $V_B$ from D/A converter 35 along with the voltage from filter 28 applies a coarse correction voltage to the pump driver 34, which operates pump 13 to change the pressure to make a coarse change in the stream velocity until the drop count has decreased to 12. After a fixed time dependent on the response time of pump 13 and the period of the COARSE signal to single shot 41, the COARSE signal is turned off and FINE signal is turned on to initiate the fine velocity correction portion of the cycle.

In the coarse mode, the A/D and D/A converters 36 and 35 act as a hold. This is necessary to force the drop count below 13.0. At a drop count of 13.0 the phase error, as determined by pulses from detector 22 and clock 16 applied to flip-flop 28, is zero, which gives a resultant of zero to the A/D converter 36. Without use of single shot 41 to disengage the A/D converter 36, the coarse loop would have locked in at 13.0 drops. The fixed time of coarse signal $T_C$ is long enough to guarantee that the pump 13 has had time to make a coarse adjustment. Delay circuit 42 is used to prevent false discriminating of the comparators 39 and 40 when switching from fine to coarse modes. The phase error hold is also needed to keep the bias voltage $V_B$ on the pump for coarse adjust, since the voltage range in which the fine adjustment from filter 28 operates is relatively narrow.

Figure 3:
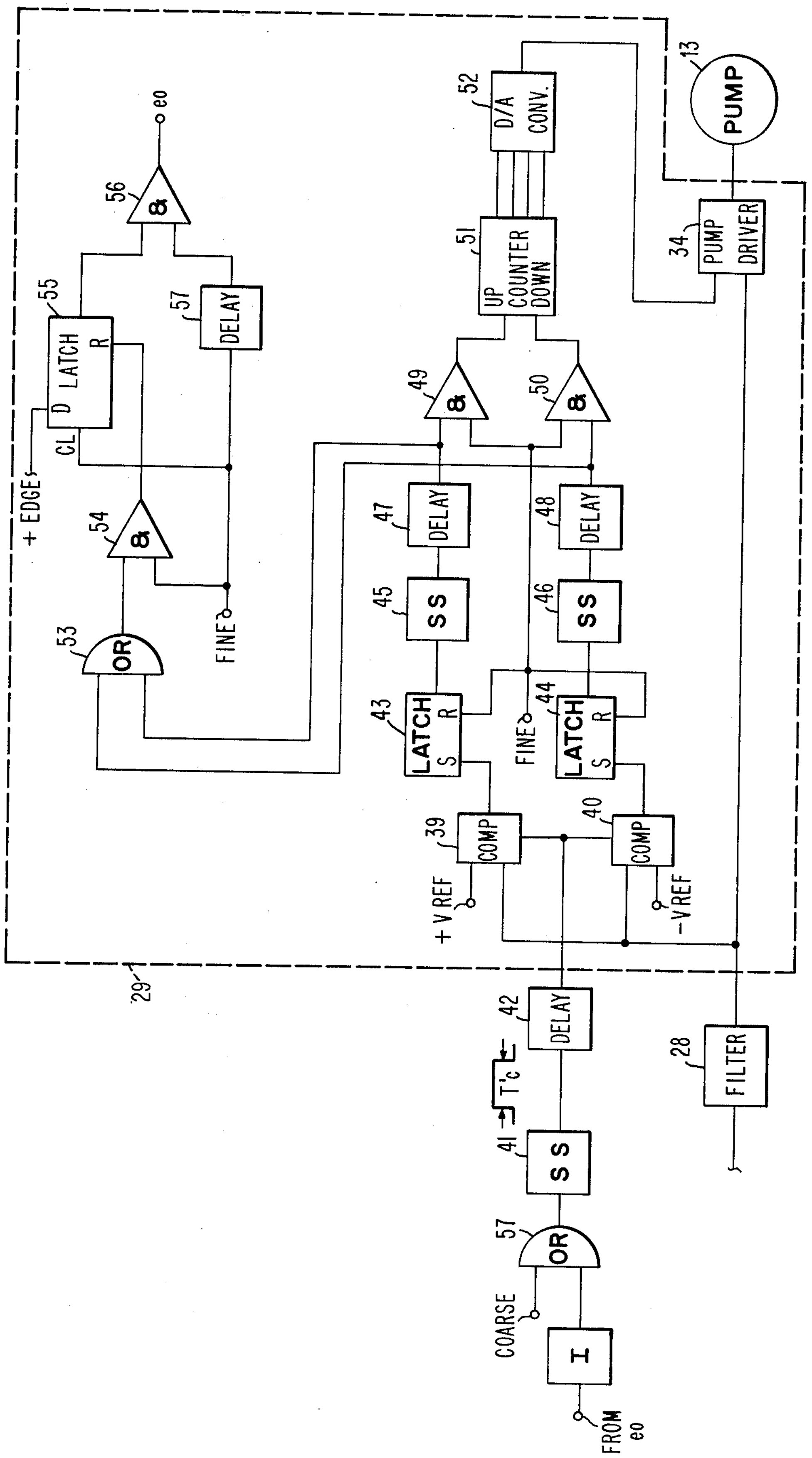
FIG. 3 is a logic diagram of the second embodiment of a coarse/fine adjustment control for regulating the pump of the ink jet printer illustrated in FIG. 1.

In the embodiment of FIG. 3, a gross phase error is corrected in a series of coarse and fine adjustments. For convenience of description, this system can be referred to as the $\frac{3}{4}$ drop scheme, since the coarse adjustment, when made, achieves a velocity change which amounts to a drop phase shift of $\frac{3}{4}$ of a drop wavelength. Other schemes might be devised which would give other coarse adjustments greater or less than $\frac{3}{4}$ of a drop wavelength provided that the coarse adjustment produces a drop phase shift greater than $\frac{1}{2}$ a drop wavelength.

As seen in FIG. 3, the coarse adjustment loop has the terminals of latches 43 and 44 connected to the output of directional comparators 39 and 40. The outputs of latches 43 and 44 are connected, respectively, through single shots 45 and 46 and delays 47 and 48 to AND gates 49 and 50. The second inputs of AND gates 49 and 50 are commoned for receipt of a FINE adjust signal from the external source. D/A converter 52 decodes the condition of up/down counter 51 and applies a coarse adjust voltage $V_B$ to pump driver circuit 34. Each single count change of counter 51 adjusts the bias voltage $V_B$ to a level which corresponds to a $\frac{3}{4}$ drop wavelength change in drop position. Voltage $V_B$ along with the voltage from filter 28 change the drop position one wavelength $\pm\frac{1}{4}$.

The operation of the invention in accordance with the embodiment of FIG. 3 is as follows, assuming again a 10 wavelength separation of excitor 15 and drop detector 22. Assume further that the system is operating with a drop count of 12. FINE control operation would show that no phase error exists (see FIG. 4). Initiation of a coarse error test again produces a pulse rate from the clock 16 which causes excitor 15 to generate 14.4 pulses, as shown in the chart in FIG. 4. After a delay caused by delay circuit 42, the $+V_{ref}$ threshold is crossed causing latch 43 to operate single shot 45 to produce a pulse delayed by delay circuit 47. During the time interval of delay 47, FINE signal is applied to AND circuits 49, 50 and 53. With the FINE signal on, the pulse from delay 47 is gated to bump counter 51 down one count. This count changes the D/A converter 52 by one count, which reduces the coarse adjustment voltage $V_B$ a fixed increment corresponding to a $\frac{3}{4}$ drop wavelength change. At the same time latch 55 is reset by signal from delay 47 through OR gate 53 and AND circuit 54. Because of the delay caused by delay circuit 57 the FINE signal arrives at AND circuit 56 when latch 55 is negative, AND 56 is not furfilled and another coarse adjust must be made. Thus, the system is adjusted from a drop count of 12.0 to 10.85 (i.e. 12 - 0.75 - 0.4). The FINE signal then causes the pump to adjust to an 11 drop count, but because latch 55 is minus the external control receives no indication from AND circuit 56 to print and the coarse adjust operation is repeated by initiating another COARSE signal to clock 16 and gate 57, as previously described. Again, counter 51 is dropped one count lower to cause a second $\frac{3}{4}$ wavelength adjustment bringing the drop count to 10.05 (0.2 from voltage 28), which when the FINE signal occurs, produces a drop count adjustment to 10. AND circuit 56 will continue to block a print signal to the external control, since latch 55 remains minus at AND gate 56 and a subsequent COARSE signal correction is again indicated. In that event latch 55 will remain plus and the next FINE adjust signal that is applied to AND circuit 54 resets latch 55 to put an UP signal on AND gate 56, which generates a print signal to the external control.

While the specific test frequency chosen to illustrate this invention is 120 percent of the printing frequency, other frequencies may be chosen to detect gross errors depending on system parameters and the desired range of operation. The 120 percent test frequency for the system parameters described produces a gross error correction scheme over a range of $\pm 2$ drop wavelengths, as seen in the chart of FIG. 4. A $\pm 4$ drop wavelength error correction arrangement could be accomplished using a test frequency of 110 percent of printing frequency.

Thus, it will be seen from the above description that an improved method and apparatus have been provided for correcting gross errors in the velocity of an ink jet stream.

While the invention has been particularly shown and described with reference to preferred embodiments thereof, it will be understood by those skilled in the art that the foregoing and other changes in form and details may be made therein without departing from the spirit and scope of the invention.

We claim:

1. In an ink jet printing apparatus, a method for monitoring and maintaining the velocity of an ink jet stream within a predetermined range which determines jet placement during printing of information comprising projecting a continuous stream of ink drops along a path toward a print medium by supplying liquid ink under pressure to a jet forming means and perturbing said stream to generate ink drops at a uniform frequency, sensing individual drops of said ink jet stream downstream from said jet forming means and developing a signal representative of the velocity of said ink drops, determining whether a gross velocity error exists in said stream by generating drops at a first frequency having a rate different from the drop generation rate for printing adjusting for sensed changes in the velocity of said ink drops generated at said first frequency by effecting a coarse correction in said pressure for supplying liquid ink to said jet forming means in the event a gross velocity error was detected, determining whether a fine velocity error exists in said stream by generating drops at said drop generation rate for printing, and then adjusting for sensed changes in the velocity of said ink drops generated at said drop generation rate for printing by making a fine correction in said pressure for supplying ink to said jet forming means in the event a further velocity error was detected.

2. In an ink jet printing apparatus, a servo system for monitoring and maintaining the velocity of an ink jet stream substantially constant which determines jet placement during printing of information comprising;

jet forming means for projecting a continuous stream of ink drops along a path toward a print medium including, a nozzle, pump means connected for supplying a liquid ink under pressure to said nozzle, drop forming means for causing perturbations in said ink liquid emitted from said nozzle;

sensor means located proximate said path for sensing individual drops of said ink jet stream and for developing a velocity error signal representative of the direction and magnitude of the change of velocity of said stream from a predetermined velocity;

and control means responsive to said velocity error signal for selectively effecting successive coarse and fine adjustments in the pressure exerted by said pump means in the event a gross error exists in the velocity of said stream, said control means including means for successively operating said drop generation means for generating drops at a test frequency different from said printing frequency and then at said printing frequency, means for determining whether a velocity error exists at said test frequency and at said printing frequency, and means for making first at least one coarse correction in said pump pressure in the event a gross velocity error exists at said test frequency and then a fine correction in the event a fine velocity error exists.

* * * * *